(12) United States Patent
Miura

(10) Patent No.: US 9,715,109 B2
(45) Date of Patent: Jul. 25, 2017

(54) DISPLAY DEVICE FOR VEHICLE

(71) Applicant: CALSONIC KANSEI CORPORATION, Saitama (JP)

(72) Inventor: Hiromasa Miura, Saitama (JP)

(73) Assignee: CALSONIC KANSEI CORPORATION, Saitama-Shi (JP)

(*) Notice: Subject to any disclaimer, the term of this patent is extended or adjusted under 35 U.S.C. 154(b) by 0 days.

(21) Appl. No.: 14/786,381

(22) PCT Filed: Mar. 26, 2014

(86) PCT No.: PCT/JP2014/058410
§ 371 (c)(1),
(2) Date: Oct. 22, 2015

(87) PCT Pub. No.: WO2014/174970
PCT Pub. Date: Oct. 30, 2014

(65) Prior Publication Data
US 2016/0070100 A1   Mar. 10, 2016

(30) Foreign Application Priority Data

Apr. 23, 2013   (JP) .................................. 2013-090048

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC .............. G02B 2027/013; G02B 27/01; G02B 27/0101; G02B 2027/014
(Continued)

(56) References Cited

U.S. PATENT DOCUMENTS

| | | |
|---|---|---|
| 7,570,430 B1 | 8/2009 | Peng et al. |
| 2007/0009714 A1 | 1/2007 | Lee et al. |

(Continued)

FOREIGN PATENT DOCUMENTS

| | | |
|---|---|---|
| CN | 101171541 A | 4/2008 |
| JP | H04-014524 U | 2/1992 |

(Continued)

OTHER PUBLICATIONS

International Search Report and Written Opinion of the International Search Report for PCT/JP2014/058410 dated Apr. 22, 2014.

*Primary Examiner* — William Choi
(74) *Attorney, Agent, or Firm* — Foley & Lardner LLP

(57) ABSTRACT

When a combiner is used, a cut part of a shift in an outer circumferential edge portion of the combiner is reduced, and a front scenery of a vehicle is more easily seen and recognized. A vehicular display device includes a displayer 4 configured to project display information; and a combiner 1 which enlarges and reflects the display information projected to the displayer 4, images the display information on a vehicle front side, and shows both a virtual image made by the imaging and the front scenery of the vehicle which is seen through. The thickness of an end portion of the combiner 1 gradually becomes thinner as being close to an edge of the combiner 1.

3 Claims, 5 Drawing Sheets

(51) Int. Cl.
  *B60K 35/00*  (2006.01)
  *B60R 1/00*  (2006.01)
(52) U.S. Cl.
  CPC .. *G02B 2027/011* (2013.01); *G02B 2027/013* (2013.01); *G02B 2027/0121* (2013.01)
(58) Field of Classification Search
  USPC .................................. 359/630, 631; 345/7, 9
  See application file for complete search history.

(56)  References Cited

U.S. PATENT DOCUMENTS

| | | |
|---|---|---|
| 2013/0188260 A1 | 7/2013 | Matsushita et al. |
| 2015/0338649 A1 | 11/2015 | Nambara |
| 2016/0046189 A1 | 2/2016 | Inomata |

FOREIGN PATENT DOCUMENTS

| | | |
|---|---|---|
| JP | 2005-156678 A | 6/2005 |
| JP | 2009-292223 A | 12/2009 |
| JP | 2012-58688 A | 3/2012 |
| JP | 5392276 B2 | 1/2014 |
| JP | 2014-115417 A | 6/2014 |
| JP | 2014-211542 A | 11/2014 |
| WO | WO-2012/176548 A1 | 12/2012 |

DISPLAY DEVICE FOR VEHICLE

TECHNICAL FIELD

The present invention relates to a vehicular display device which shows a display image of information to a user by using a combiner.

BACKGROUND ART

As a vehicular display device in the related art, a device described in Patent Document 1 is known.

In the vehicular display device in the related art, a combiner which is attached to a vehicle compartment side surface of a windshield receives display light emitted from the display device installed below the windshield and reflects the display light to a driver side, and the driver can see a virtual image which is obtained being enlarged by the reflection and overlaps scenery in front of the windshield.

In the combiner, an arc-shaped first optical surface which has a set magnification of a front surface thereof to exceed 1 time the outside of the windshield with respect to the driver, and can notice a first virtual image of the display light, is formed. In addition, an arc-shaped second optical surface in which a rear surface receives the display light emitted from the display device and reflects the display light to the driver side, and which can notice a second virtual image in which the size and a position thereof match those of the first virtual image on the outside of the windshield with respect to the driver.

RELATED DOCUMENTS

Patent Documents

Patent Document 1: JP-A-2012-58688

SUMMARY OF THE INVENTION

Problems that the Invention is to Solve

However, there is a problem as will be described below in the above-described vehicular display device in the related art.

In other words, in order to overlap the virtual image to be displayed with the front scenery and show the virtual image, the combiner is formed of a transparent material in a substantially squared shape. A side portion which is an outer circumferential edge portion of the square is perpendicular to the front surface and the rear surface, and has a certain level of thickness.

In this case, since a bending direction drastically changes in the outer circumferential edge portion of the combiner, a front scenery of a vehicle when viewed by the driver through the combiner and a front scenery of a vehicle when viewed not through the combiner are shifted from each other in a cut state in the outer circumferential edge portion of the combiner, and it is extremely hard for the driver to see the image.

As illustrated in FIG. 8 (schematically illustrated for making it easy to understand) and 9, when the driver sees the front scenery via a combiner 100 supported by supporting means which is not illustrated on a vehicle compartment inner side surface of a windshield 101, a shift amount of the front scenery due to the bending by a side portion 100a of the outer circumferential edge portion of the combiner 100 drastically changes. For this reason, for example, in case of a stop line L1 which is drawn to a road 105, a part which is seen through the combiner 100 on the stop line L1 is seen by eye E of a driver as a stop line L2 which is at a much lower position. As a result, a stop line which is originally straight is seen to be separated to two stop lines L1 and L2 in which a cutting shift ΔL is generated.

Similarly, a tip end portion of a front bonnet 103 of the vehicle is also in a cut state and shifted in the outer circumferential edge portion of the combiner 100. In addition, respectively, an installment panel 104 is seen in FIG. 8, and a part of a steering wheel 102 is seen in FIG. 9. In addition, a display image of information seen by the combiner 100 is omitted in the drawing.

It is difficult to avoid a shift of the front scenery of the vehicle in the outer circumferential edge portion of the combiner. In this case, the shift is in a cut state, and this makes it hard for the driver to see the front scenery of the vehicle. Therefore, it is hard for the driver to recognize the front scenery of the vehicle.

In consideration of the above-described problem, an object of the present invention is to provide a vehicular display device which reduces a cut part of a shift in an outer circumferential edge portion of a combiner, makes it easier to see a front scenery of a vehicle, and makes it easier to recognize the front scenery, when the combiner is used.

Means for Solving the Problems

In order to attain this object, a vehicular display device of the present invention includes: a displayer configured to project display information; and a combiner which enlarges and reflects the display information projected to the displayer, images the display information on a vehicle front side, and shows both a virtual image made by the imaging and a front scenery of a vehicle which is seen through, wherein the thickness of an end portion of the combiner gradually becomes thinner as being close to an edge of the combiner.

Advantages of the Invention

The vehicular display device of the present invention makes the thickness of the end portion of the combiner gradually become thinner as being close to the edge of the combiner. Accordingly, it is possible to reduce or eliminate the cut part of the shift in the outer circumferential edge portion of the combiner between the front scenery of the vehicle which is seen through the combiner and the front scenery of the vehicle which is seen not through the combiner. Therefore, it becomes easy to see and recognize the front scenery of the vehicle.

MODES FOR CARRYING OUT THE INVENTION

Figure 1:
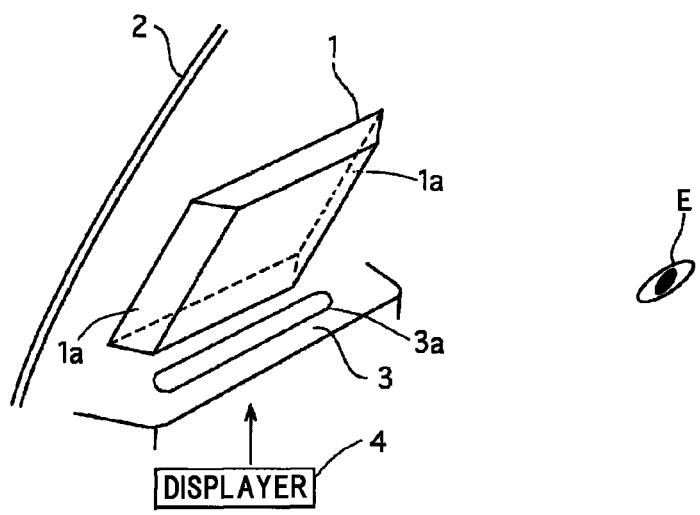
FIG. 1 is a perspective view of a vehicular display device according to Example 1 of the present invention.

Hereinafter, embodiments of the present invention will be described in detail based on examples illustrated in the drawings.

Example 1

First, the entire configuration of a vehicular display device of Example 1 will be described based on FIGS. 1 and 2.

Figure 2:
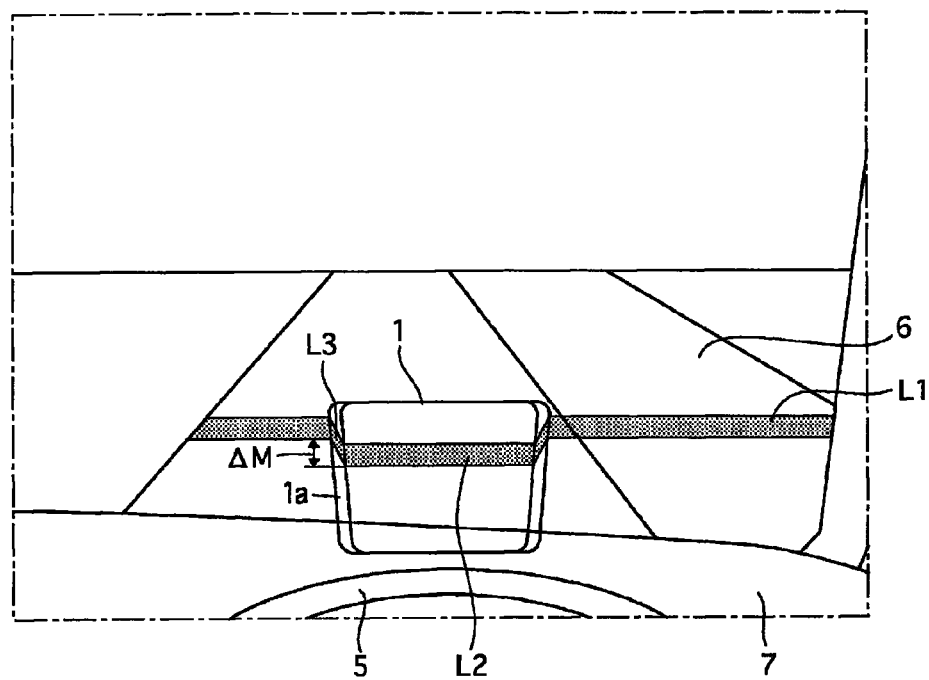
FIG. 2 is a view illustrating a front scenery of a vehicle when a driver sees the front scenery by using the vehicular display device according to Example 1.

As illustrated in FIGS. 1 and 2, in the vehicular display device of Example 1, a combiner 1 which is formed of a transparent material is supported by a supporting member which is not illustrated in front of a driver, on a vehicle compartment inner side of a windshield 2 in front of a vehicle.

Meanwhile, inside an installment panel 3 below the windshield 2, a displayer 4 which can display information, such as vehicular information, to the driver is disposed. A display surface of the displayer 4 is oriented toward the combiner 1. Accordingly, the displayer 4 can project the display information (projected image) to the combiner 1 through an opening 3a of the installment panel 3.

Here, the combiner 1 has a transparent and substantially rectangular parallelepiped, and the center part thereof is formed along a vehicle compartment side surface of the windshield 2 on a front side of the vehicle in a substantially flat shape or in a shape of an arc. However, the thickness of a side wall 1a of the outer circumferential edge portion is formed to gradually become thinner as being close to the edge.

Figure 3A:
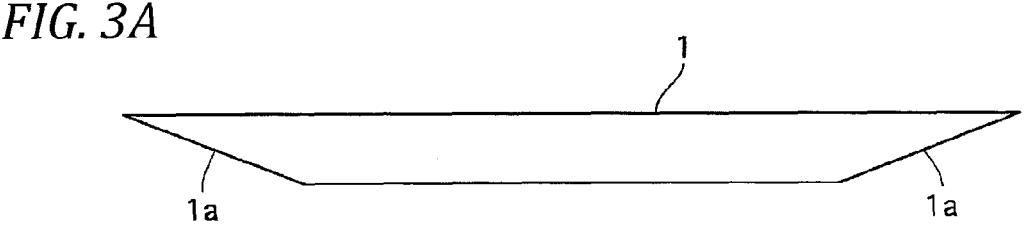
FIGS. 3A to 3C are plan views respectively illustrating 3 types of combiners which are used in the vehicular display device of Example 1 and have tapered surfaces.
Figure 3B:
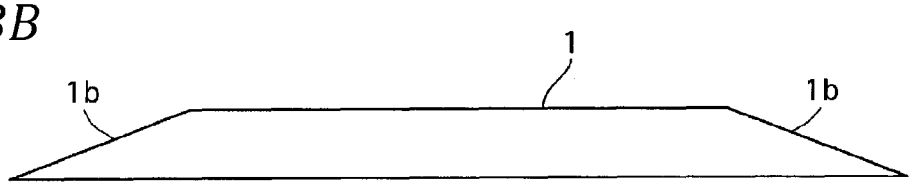
Figure 3C:
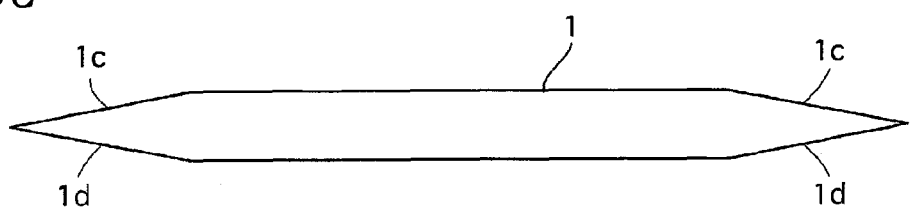

In other words, on both end sides of the side wall 1a of the outer circumferential edge portion, a surface on the vehicle compartment side is a tapered surface 1a as illustrated in FIG. 3A, a surface on the front side of the vehicle is a tapered surface 1b as illustrated in FIG. 3B, or a surface on the front side of the vehicle is a tapered surface 1c and a surface on the vehicle compartment side is formed on a tapered surface 1d as illustrated in FIG. 3C, and a shift amount of the front scenery due to the bending gradually changes.

FIG. 2 is the front scenery of the vehicle viewed from the driver when the combiner 1 which has a form illustrated in FIG. 3A is used.

In addition, as illustrated in FIG. 2, the driver can see an image or the scenery on the outside of the vehicle as will be described below in addition to a steering wheel 5 or a bonnet 7 which are seen.

In addition, in FIG. 2, although a display image due to the combiner 1 is omitted, but when displaying, a projected image of the display information of the displayer 4 is imaged at a front position of the vehicle by the combiner 1, and as a result, the driver can see the display image on the front side of the vehicle of the combiner 1.

In addition, the driver can see the front scenery of the vehicle together with the above-described display image through the combiner 1 since the combiner 1 is transparent, and further, the driver can see the front scenery of the vehicle through the windshield 2, but not through the combiner 1 on an outer side of the combiner 1.

In this case, for example, when a stop line L1 of a road 6 is seen, in a region which is not through the combiner 1, the stop line L1 is directly seen through the windshield 2. In a region where the stop line L1 is seen through the combiner 1, the stop line is seen to be bent. As a result, the position is shifted, and the stop line is seen as a stop line L2 which is shifted by ΔM in a vertical direction (lower side in FIG. 2) from the stop line L1 which is seen on the outer side of the combiner 1.

In addition, on both end edge portion sides (tapered surface 1a) of the combiner 1, as being close to the edge, left and right ends of the stop line L2 which is seen through a flat surface of the combiner 1 are oriented toward an outer part of both left and right ends of the combiner 1 of the stop line L1 which is seen not through the combiner 1, and the stop line is seen as a stop line L3 which continues and changes so that the shift in the vertical direction gradually becomes small.

In other words, the stop line L1 is seen as the stop line L2 in which the center part thereof is shifted in the vertical direction in the region which is seen through the combiner 1, but the stop line becomes the stop line L3 at each of the both end sides thereof, and is seen in a state of being continued and connected to the stop line L1 which is directly seen on the outsides of both end edge portions of the combiner. In this case, the shift in the vertical direction becomes small as approaching the edge of the combiner 1, and the stop line matches the stop line L1.

Therefore, even when the stop line L1 is seen being shifted by the combiner 1, since the stop line is continued and changed without being cut, the driver can easily see and recognize the stop line early without a mistake.

Here, a viewing manner of the stop line is described, but a viewing manner of the entire front scenery of the vehicle is also similar thereto.

In addition, even when the combiner 1 having a shape illustrated in FIGS. 3B and 3C is used, it is possible to obtain effects similar to the description above.

A vehicular device of Example 1 has the following effects.

In the vehicular device of Example 1, the thickness of both end portions of the combiner 1 gradually becomes thinner as being close to the edge of the combiner 1. Accordingly, the front scenery of the vehicle is shifted between the scenery which is seen through the combiner 1 and the front scenery of the vehicle which is seen not through the combiner 1, and the sceneries are continued or continuously connected in a close state in both end edge portions of the combiner 1 even when the scenery which is seen through the combiner 1 is seen being enlarged. Accordingly, the shift of a component in a horizontal direction on the outside of the vehicle is not cut, and the size thereof also match even on any side where the shift gradually changes.

Therefore, the driver can easily see the front scenery, and early and clearly recognize that the front scenery of the vehicle is the same as the scenery is continuous even when a change in the shift or the size is generated in the front scenery of the vehicle by the combiner 1.

In addition, a part in which the thickness gradually changes is provided in both end edge portions of the combiner 1. Accordingly, it is possible to increase a reflective surface of the combiner 1 which reflects the projected image of the display information of the displayer 4 and generates a virtual image.

In addition, when the tapered surfaces 1c and 1d are provided on both surfaces of the combiner 1, the connection becomes smooth and awkwardness due to the shift is further reduced.

In addition, since at least one of a vehicle front side surface and a vehicle compartment side surface of left and right end portions of the combiner 1 are formed on the tapered surfaces 1a to 1d, it is possible to achieve easy manufacturing and inexpensive configuration in order to obtain the above-described effects.

Next, other examples (Examples 2 to 4) will be described. In the description of Examples 2 to 4, configuration components which are similar to those in Example 1 will be omitted from the drawings and will be given the same reference numerals, the description thereof will be omitted, and only differences will be described.

Example 2

A vehicular display device of Example 2 is different from that of Example 1 only in that the shape of both end edge portions of the combiner 1 which is used in the vehicular display device of Example 1 is deformed.

Figure 4A:
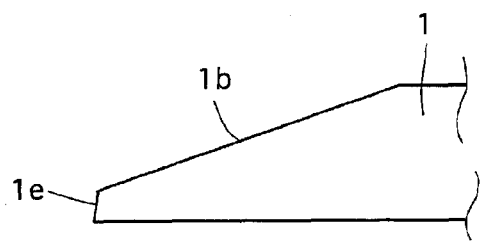
FIGS. 4A and 4B are views respectively illustrating end portions of the combiner which is used in a vehicular display device according to Example 2 of the present invention.

In Example 2, as illustrated in FIG. 4A, an edge part of the tapered surface (in FIGS. 3A and 3B) provided only on one surface side of the combiner 1 is further inclined, and a short second tapered surface 1e continues to the tapered surface 1a or the tapered surface 1b. Otherwise, as illustrated in FIG. 4B, an edge part of the tapered surface (in FIG. 3C) provided on both surface sides of the combiner 1 is connected to a short plane 1f.

Figure 4B:
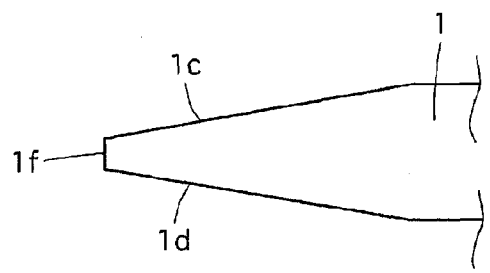
Figure 5A:
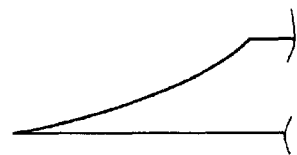
FIGS. 5A to 5D are views respectively illustrating end portions of the combiner which is used in a vehicular display device according to Example 3 of the present invention.
Figure 5B:
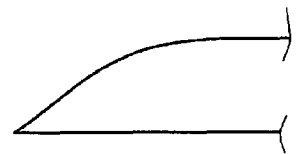
Figure 5C:
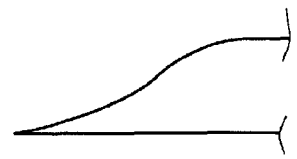
Figure 5D:
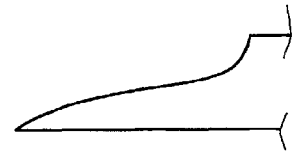

In addition, in FIGS. 4A and 4B, only one end portion side is illustrated, but the other end portion side is also similar.

Even in the case of the description above, since the tapered surface 1e and the plane 1f are extremely short, the cut part of the shift can be extremely small.

Therefore, even in this case, it is possible to obtain effects similar to those in Example 1.

In addition, since the thickness of the edge of the combiner 1 does not become 0, it is possible to avoid that a tip end becomes sharp and likely to be folded.

Example 3

A vehicular display device of Example 3 is different from that of Example 1 and Example 2 only in that the shape of both end edge portions of the combiner 1 which is used in the vehicular display device of Example 1 is deformed.

In Example 3, instead of the tapered surface (in FIGS. 3A and 3B) provided only one surface side of the combiner 1 in Example 1, as illustrated in FIGS. 5A to 5D, the scenery is continued and connected at any of wave-like curved surface parts which have different directions of unevenness.

In addition, in FIGS. 5A to 5D, only one end portion side is illustrated, but the other end portion side is also similar.

Even in this manner, it is possible to achieve effects similar to those in Example 1.

Example 4

A vehicular display device of Example 4 is different from that of Examples 1 to 3 in that the shape of the both end edge portions of the combiner 1 which is used in the vehicular display device of Example 1 is deformed.

Figure 6A:
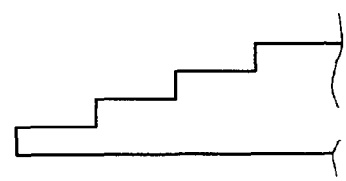
FIGS. 6A and 6B are views respectively illustrating end portions of the combiner which is used in a vehicular display device according to Example 4 of the present invention.
Figure 6B:
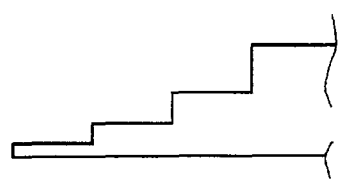

In Example 4, instead of the tapered surface (in FIGS. 3A and 3B) provided only one surface side of the combiner 1 in Example 1, a uniform stepped part illustrated in FIG. 6A and an ununiform stepped part illustrated in FIG. 6B are used.

In addition, in FIGS. 6A and 6B, only one end portion side is illustrated, but the other end portion side is also similar.

Figure 7:
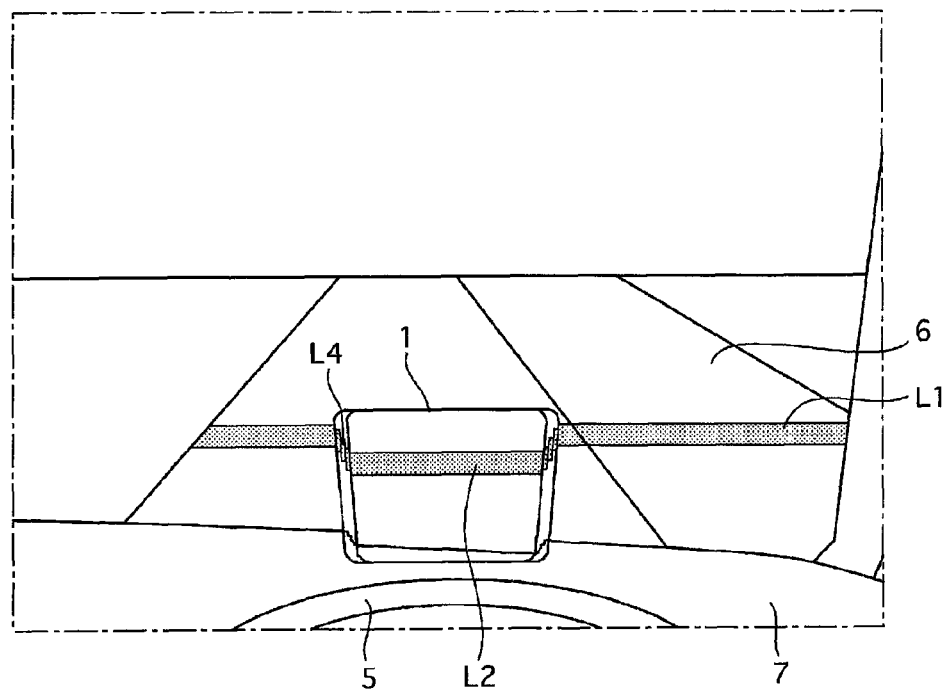
FIG. 7 is a view illustrating the front scenery of the vehicle when the driver sees the front scenery by using the vehicular display device according to Example 4 having the combiner of FIGS. 6A and 6B.
Figure 8:
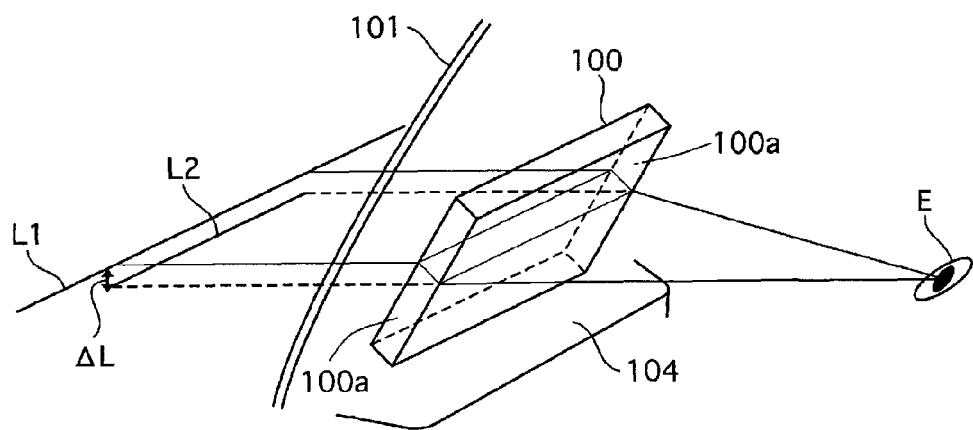
FIG. 8 is a perspective view of a vehicular display device in the related art.
Figure 9:
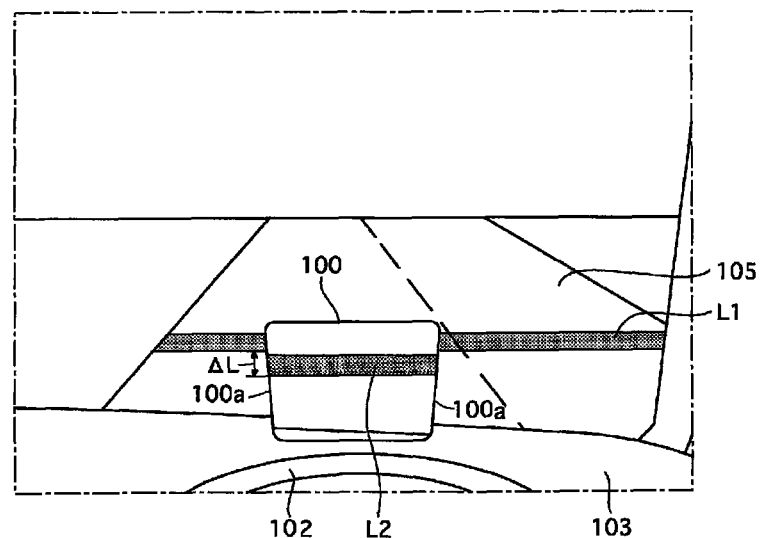
FIG. 9 is a view illustrating the front scenery of the vehicle when the driver sees the front scenery by using the vehicular display device of FIG. 8.

FIG. 7 is the front scenery of the vehicle viewed from the driver in a case where the uniform stepped shape of FIG. 6A is used. In addition, in FIG. 7, the display image due to the combiner 1 is omitted from the drawing, but when displaying, the projected image of the display information of the displayer 4 at the front position of the vehicle is imaged by the combiner 1, and as a result, the driver can see the display image on the vehicle front side of the combiner 1. Furthermore, the example is the same as Example 1 in that the driver can see the front scenery of the vehicle together with the display image through the combiner 1, and further, the driver can see the front scenery of the vehicle through the windshield 2 not through the combiner 1 on the outer side of the combiner 1.

In this case, for example, when the stop line L1 of the road 6 is seen, in the region which is not through the combiner 1, the stop line L1 is directly seen through the windshield 2. However, in the region where the stop line L1 is seen through the combiner 1, the stop line is seen to be bent, and as a result, the stop line is seen as the stop line L2 which is shifted in the vertical direction from the stop line L1 which is seen on the outer side of the combiner 1.

However, on the both end edge portion sides of the combiner 1, due to the effects of the stepped part, the shift in the vertical direction of a stop line L4 gradually becomes small as being close to both side edges of the combiner 1 from the stop line L2, and the stop line is seen to be linked to the stop line L1 on the edge.

Therefore, even in this case, it is possible to achieve the effects similar to those in Example 1.

In addition, since both end edge portions of the combiner 1 are in a stepped state, it is possible to eliminate the left and right shift of the image by a prism effect when the thickness becomes thin on a straight line.

As described in detail above, if the vehicular display device according to each of the above-described embodiments of the present invention is employed, as the thickness of the end portion of the combiner 1 gradually becomes thinner as being close to the edge of the combiner 1, it is possible to reduce or eliminate the cut part of the shift in the outer circumferential edge portion of the combiner 1 between the front scenery of the vehicle which is seen through the combiner 1 and the front scenery of the vehicle which is seen not through the combiner 1. Therefore, it becomes easy to see and recognize the front scenery of the vehicle.

In addition, as at least one of the vehicle front side surface and the vehicle compartment side surface of the combiner 1 is formed on any of the tapered surface, curved surface, and stepped surface, it is possible to improve the cut part of the shift easily and inexpensively.

In addition, by forming one of the vehicle front side surface and the vehicle compartment side surface of the combiner 1 on the stepped surface, it is possible to improve the cut part of the shift easily and inexpensively.

Above, the present invention is described based on the above-described examples, but the present invention is not limited to the above-described examples, and a case of a design change or the like without departing from the main idea of the present invention is also included in the present invention.

For example, the entire shape of the combiner 1 is not limited to a substantial square as illustrated in Example 1, another shape may be employed.

In addition, the present application is based on Japanese Patent Application No. 2013-090048 filed on Apr. 23, 2013, and the content thereof is incorporated herein by reference. In addition, the entire reference is taken as a whole.

DESCRIPTION OF REFERENCE NUMERALS AND SIGNS

E: eye of driver
L1, L2, L3, L4: stop line
1, 100: combiner
1a: side wall (tapered surface)
1b, 1c, 1d, 1e: tapered surface
1f: plane
2, 101: windshield
3, 104: installment panel
4: displayer
5, 102: steering wheel
6, 105: road
7, 103: bonnet

The invention claimed is:

1. A vehicular display device comprising:
a displayer configured to project display information; and
a combiner which enlarges and reflects the display information projected to the displayer, images the display information on a vehicle front side, and shows both a virtual image made by the imaging and a front scenery of a vehicle which is seen through,
wherein the thickness of a pair of left and right side ends of the combiner become thinner as being close to an edge of the combiner.

2. The vehicular display device according to claim 1, wherein at least one of a vehicle front side surface or a vehicle compartment side surface of the left and right side ends of the combiner has a tapered surface or a curved surface.

3. The vehicular display device according to claim 1, wherein one of a vehicle front side surface and a vehicle compartment side surface of the left and right side ends of the combiner has a stepped surface.

* * * * *